C. NAPIER.
METAL SAWING MACHINE.
APPLICATION FILED AUG. 29, 1908.
935,395.
Patented Sept. 28, 1909.
3 SHEETS—SHEET 1.
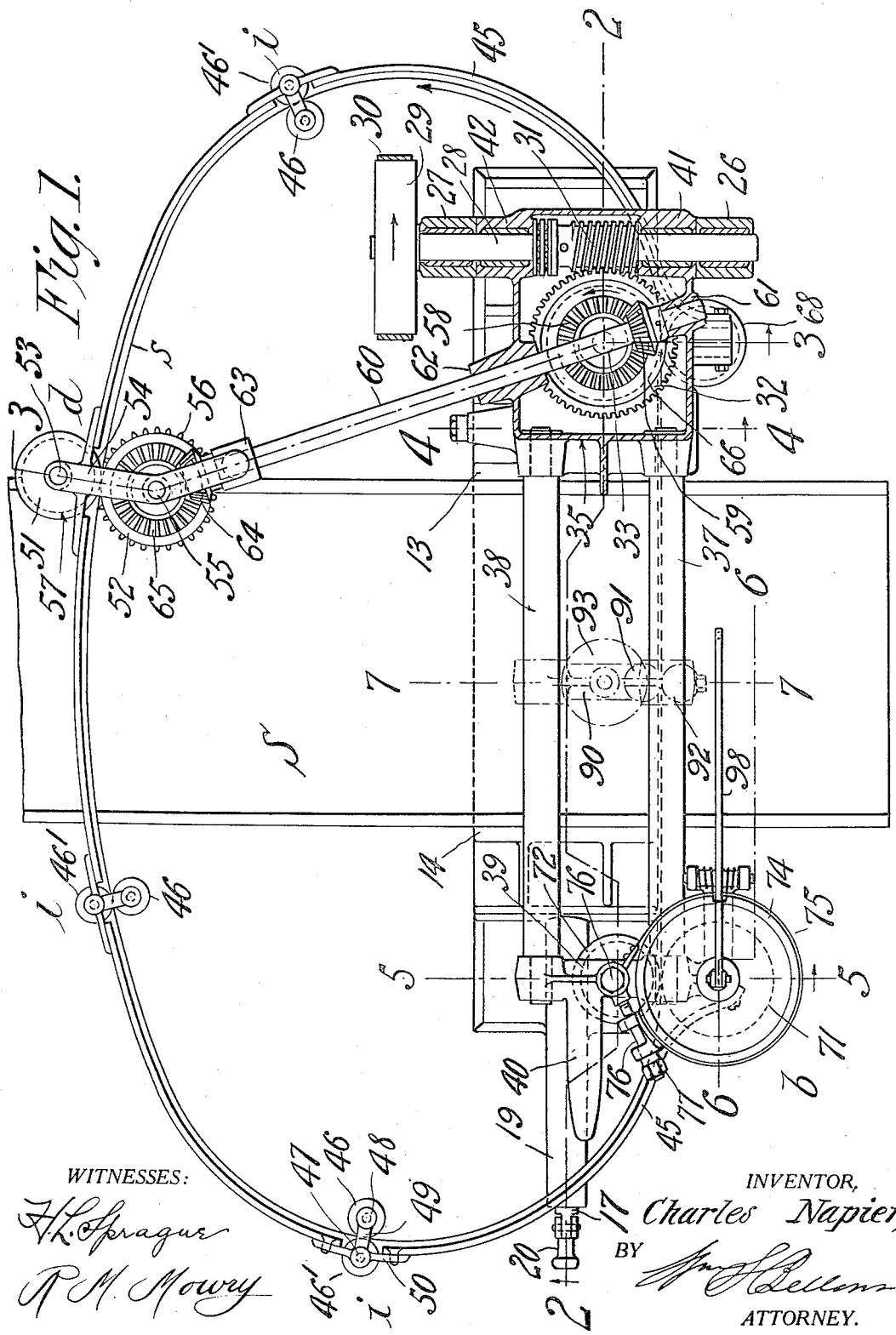
WITNESSES:
H. L. Sprague
R. M. Mowry
INVENTOR,
Charles Napier;
BY
ATTORNEY.

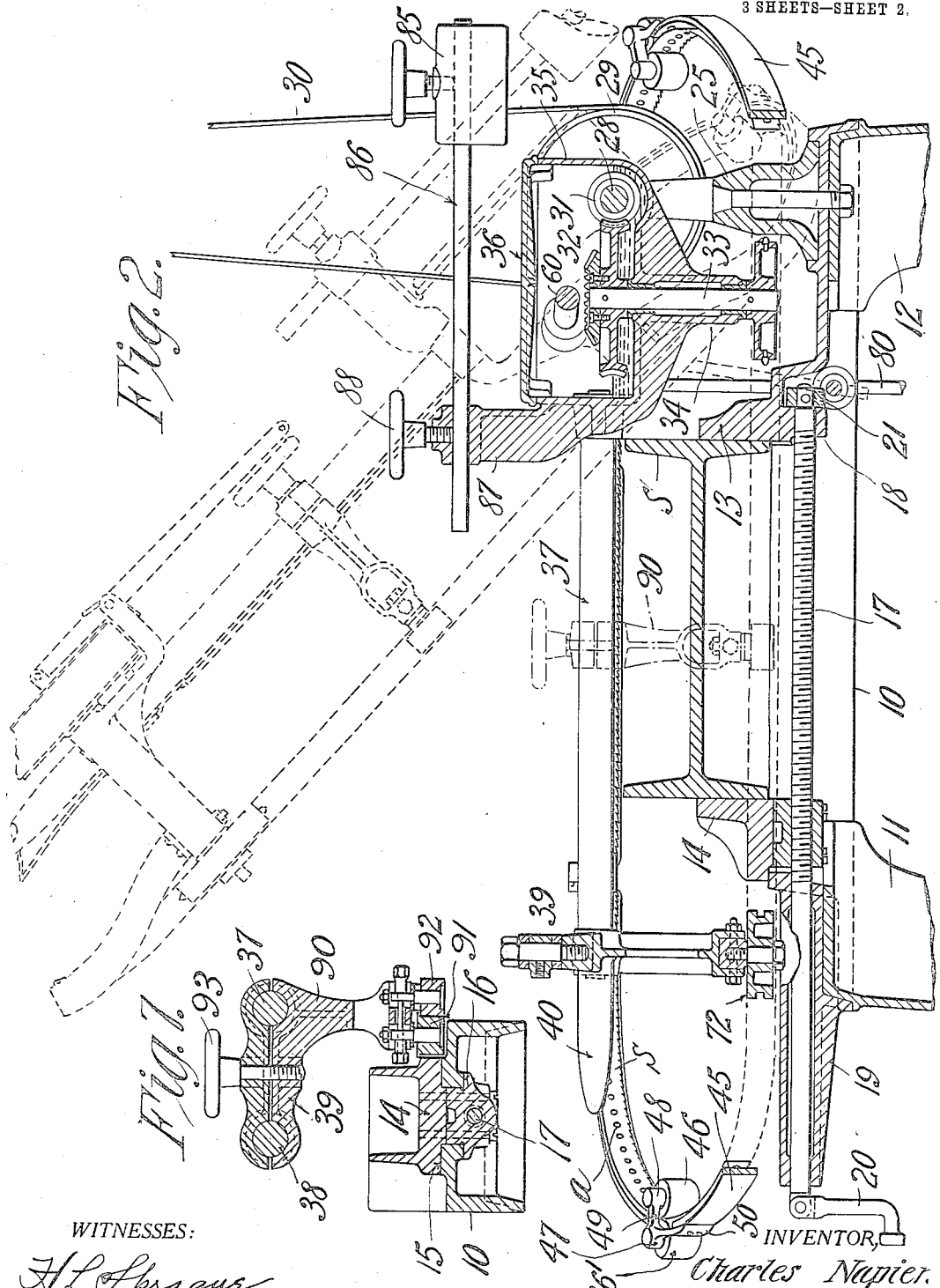

C. NAPIER.
METAL SAWING MACHINE.
APPLICATION FILED AUG. 29, 1908.
935,395.
Patented Sept. 28, 1909.
3 SHEETS—SHEET 3.
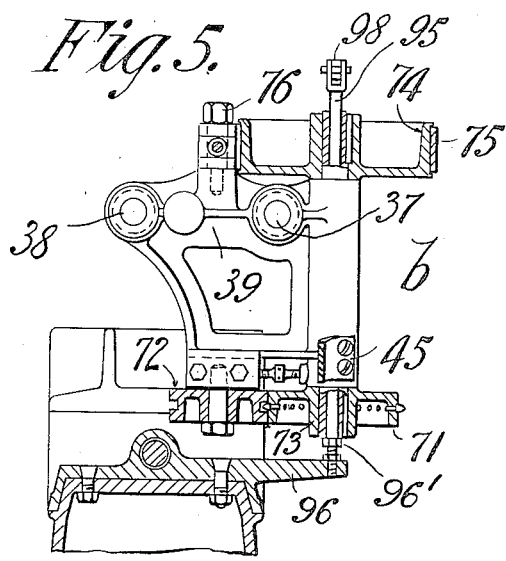
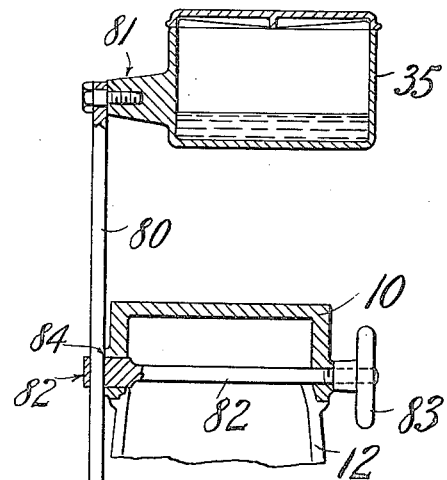
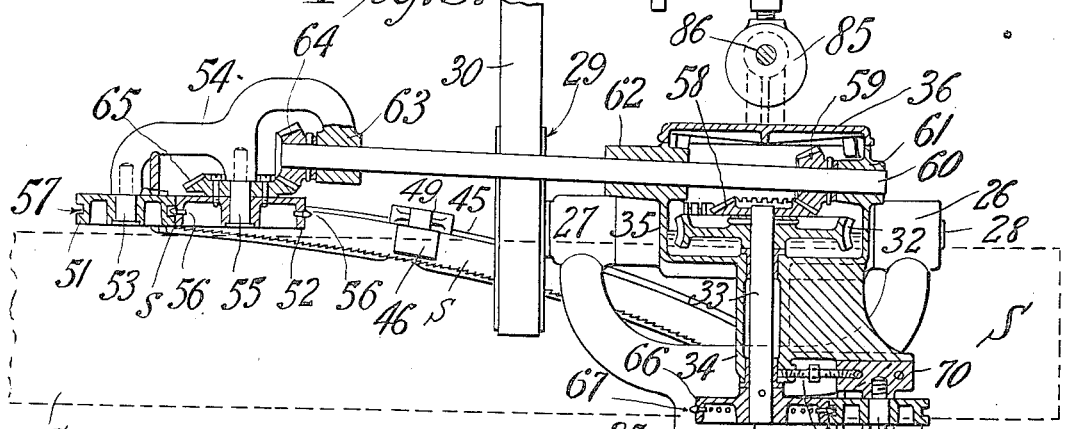
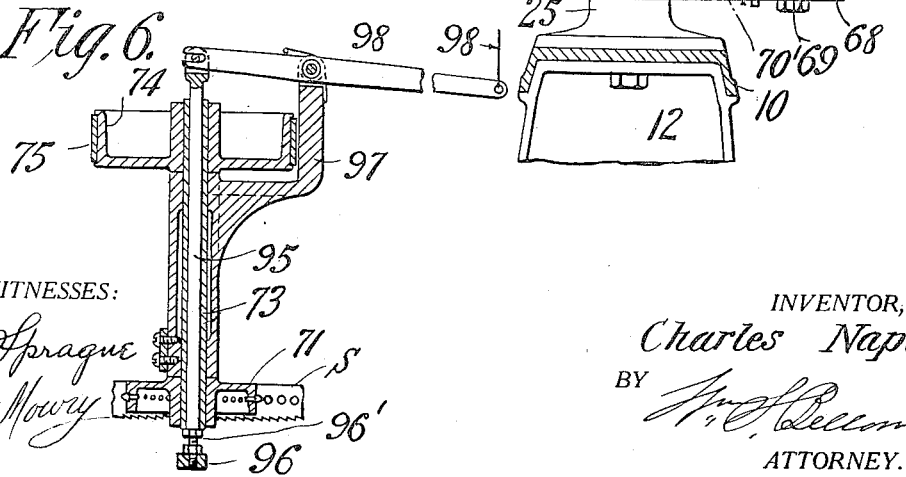
WITNESSES:
H. L. Sprague
R. M. Mowry
INVENTOR,
Charles Napier.
BY
ATTORNEY.

UNITED STATES PATENT OFFICE.

CHARLES NAPIER, OF SPRINGFIELD, MASSACHUSETTS.

METAL-SAWING MACHINE.

935,395.

Specification of Letters Patent.   Patented Sept. 28, 1909.

Application filed August 29, 1908.   Serial No. 450,815.

*To all whom it may concern:*

Be it known that I, CHARLES NAPIER, a citizen of the United States of America, and resident of Springfield, in the county of Hampden and State of Massachusetts, have invented certain new and useful Improvements in Metal-Sawing Machines, of which the following is a full, clear, and exact description.

This invention relates to metal-sawing machines, and it has for one of its objects the provision of a mechanism, the general organization of which is similar to the reciprocatory power hack-saw, but which in the present case embodies an endless band-saw to which a continuously-advancing movement is imparted.

My invention has, furthermore, for its object, the combination with the continuously advancing saw, of a supporting frame therefor which may be raised to permit work to be placed into the machine, and which may be weighted to bring the saw teeth into engagement with the work under such pressure as may be best adapted to the existing conditions as to the quality of the saw-blade and the metal-stock to be operated upon.

The invention has, also, for its object the provision of means whereby the band-saw is maintained in a taut condition at such portion of its movement where it cuts into the work.

A further object of invention resides in the provision of means whereby the loose or slack portion of the band-saw is supported so as to clear the work at all times, some of these means being preferably driven in a positive manner and at a speed equal to that of the saw-driving mechanism so that the band may run freely and without liability of buckling.

My invention has, furthermore, for its object the provision of means whereby the power-driving mechanism may be disconnected from the machine so soon as the work of cutting-off has been completed.

Further objects of the invention will hereinafter appear and the means of their attainment set forth in the claims.

In the accompanying drawings, in which similar characters denote similar parts, Figure 1 is a top view of a metal-sawing machine embodying my invention. Fig. 2 is a vertical sectional elevation on line 2—2, of Fig. 1. Fig. 3 is a vertical cross-section on line 3—3, Fig. 1. Fig. 4 is a similar section on line 4—4, Fig. 1. Fig. 5 represents a section on line 5—5, of Fig. 1. Fig. 6 shows a section on line 6—6, of Fig. 1, and Fig. 7 illustrates a cross section of an attachment indicated in dot and dash lines in Fig. 1, said section being taken on line 7—7, indicated therein.

Briefly stated, the present machine has for its principal active member a continuously advancing band saw which is guided on a tiltable frame in such a manner that it will engage the stock to be cut in one portion of its run, and will subsequently be held out of contact therewith so that the stock will be operated upon in one place only. The band-saw is guided at various points of its travel, and is maintained in taut condition during the operating run of its length in order to produce a straight line cut. In addition to these features the saw-supporting devices are held on a frame which is pivoted so as to permit the operator to raise the saw bodily and clear of the stock to be cut, and on a principle which is common to the ordinary reciprocating power hack-saw in general shop-use, without, however, disarranging the saw-driving mechanism in any way.

In view of the work to be done by the present machine, the saw is made of a flexible steel band of sufficient depth to carry the load of the frame which constitutes the medium whereby the saw is fed into the stock, and inasmuch as at the cutting run of the saw the tendency is to force the saw upward, while at its free and return movement the weight of the blade would naturally cause the latter to gravitate, and inasmuch, furthermore, as the blade or band cannot consistently be supported from below on account of the teeth on the blade-edge tending to cut into the support, I deem it desirable to provide in the band a series of equi-distant apertures or perforations adapted to receive projections or pins on the supporting wheels, which latter can also serve as devices for advancing the band, at the same time.

Referring to the drawings, 10 denotes the bed plate of the machine supported on legs 11, 12, and having at one end a fixed abutment 13 against which the stock to be cut, and herein indicated as an I-beam S, may be placed and securely held by a movable clamp-jaw 14 which is guided on ways 15 (see Fig. 7) of the bed 10, and carries a nut 16 in screw-threaded engagement with a screw-rod 17. The axis of this rod is disposed in parallelism with the ways 15, and it is journaled in a lug 18 projecting from the fixed jaw 13, and also in a bracket 19, at which end it has a crank 20 for manipulation, endwise movement of the rod being prevented by a collar 21 secured thereto. The I-beam S, as shown, is substantially the largest work which the present machine is capable of operating upon, and it is evident that any work of less dimensions can be readily placed and held between the jaws 13 and 14.

Secured to the right hand end of the bed 10, is a stand 25 which is bifurcated at its top (see Fig. 3), to form a pair of bearings 26, 27, for a shaft 28 which constitutes the power-driven element of the machine and has a pulley 29, driven by a belt 30 from a countershaft overhead. The shaft 28 has a worm 31 in engagement with a worm gear 32 on a vertically-disposed shaft 33, which latter is journaled in a bearing 34 forming a part of the tiltable saw-supporting frame which in its preferred form comprises a chambered head casing 35 adapted to receive a quantity of oil for maintaining the worm and worm gear in constantly-lubricated condition, and the open top may be closed by a cover 36, as shown in Figs. 2 and 3. The saw-supporting frame comprises also a pair of parallel rods 37, 38, rigidly secured to the head casing 35 and united at their other ends by a yoke 39 having a handle 40 whereby the frame, as a whole, may be swung upward around the axis of the worm shaft 28 on which it is pivoted by virtue of a pair of bearing-lugs 41, 42 (see Fig. 1) formed on the casing 35, so that, therefore, the tilting movement of the frame as indicated by dotted lines in Fig. 2, will not disarrange the operative connection existing between the worm 31 and gear 32. The saw-blade employed in the present case, consists of an endless band s, having the saw teeth at its lower edge and guided in its travel in such a way that the stock held between the jaws will be cut on a line substantially at right angles with the running length of the stock, the guiding devices being disposed at certain points on what may be termed a "guard" which consists preferably of a curved and comparatively stiff metal strap or band 45 rigidly secured at its ends to the casing 35, and the yoke 39, respectively (see Figs. 1 and 5). In the present instance there are six guiding devices shown, some of which are idlers for freely guiding the saw-band to form a loose-loop return; while others are positively driven to propel the saw blade along and maintain the same in proper running travel so as to be clear of the guard band.

In view of the fact that the saw is intended to cut the stock only at one particular place, it is, of course, obvious that the blade must be guided, after it leaves the stock, so that its returning portion will not engage or drag over the stock no matter to how low a position the cutting portion of the saw may have eaten its way into the work, even to the extent of having cut the latter entirely off. Hence the rear portion of the guard plate is disposed so as to guide the saw-band across the work at a level above the same, as shown in Figs. 2 and 3 while at the same time care is taken to maintain the saw blade in a vertical position, cross-sectionally, and at a right angle with the work and also with the axis of the shaft 28 on which the saw-frame is pivoted as above mentioned. Taking the plane of the stock-support as a basis, the active portion of the saw-band in running nearer thereto than the idle return portion of the saw, so that, relatively to the vertical feed movement, the idle portion of the saw will run rearwardly of its active portion, in fact, to such an extent, that, even when the active portion has descended below the level of the stock-support, the teeth of the idle portion are still clear of said support.

Referring to Fig. 1, the guard strap 45 carries a series of saw guides, indicated in a general way by i, each of which consists preferably of a pair of rollers 45, 46, journaled on studs 47, 48, of a yoke 49 which is provided with a foot plate 50 secured to the guard, the saw blade passing between said rollers and being thus distanced in its travel relatively to the guard 45. The saw is also guided at d by a pair of coöperative rollers 51, 52; (see Fig. 3) which at the same time serve as drivers to maintain the saw band at proper speed on its inactive or return traveling portion thereof. Of these, the roller 51 is rotatively mounted on a stud 53 carried by a yoke 54 which is secured to the guard 45 and has also a fixed stud 55 for supporting the roller 52, the latter constituting the saw-driving and supporting element, and being provided with peripheral pins 56 adapted to enter a series of equi-distantly disposed apertures a (see Fig. 2) of the saw-band s, the idle roller 51 being provided with a circumferential groove 57 to clear the pins 56. The roller 52 is positively driven from the work shaft 28 above mentioned, by a bevel gear 58 secured to the gear-spindle 33 and meshing with a bevel pinion 59 on a shaft 60 which is journaled in bearings 61, 62, of the casing 35 and also in a bearing 63 of the yoke 54, and which, furthermore, has a pinion 64 in engagement with a bevel gear 65 rotatively connected with the driving roller 52.

Secured to the lower end of the worm-gear spindle 33, is a saw-driving roller 66 having pins 67 adapted to enter the apertures *a* of the saw-band *s* and coöperative with a grooved idle roller 68 which is mounted for rotation on a stud 69 held on a slide-block 70 movable on the underside of the casing 35 and adapted to be adjusted (to grip the saw blade) by a bolt 70′, the entire organization being such as to rotate the rollers 66 and 52 at the same circumferential speed, it being understood, however, that the greater portion of the work in driving the saw is performed by the roller 66 where the saw blade is pulled across the stock to be cut, and which, furthermore, has to overcome a certain amount of "drag" which is applied to said band just before its teeth engage the stock to be cut for the purpose of rendering the blade taut in its cutting operation and thus produce a straight line cut. In the drawings this brake or drag-mechanism is illustrated at *b* (see Figs. 1 and 5) and it consists of a pin-roller 71 coöperative with an idler 72 and secured to the lower end of a sleeve 73 which carries at its upper end a drum 74, which is partially surrounded by a brake-belt 75, one end of which is fixed on a post-stud 76 while its other and loose end is tightened by a bolt 76 and draw-nut 77.

From the foregoing it will be understood that the roller 71 is rotated by the movement of the saw-band so that the brake-belt 75 will become effective in tightening the same between the roller 71 and the driver 66, between which points said band will also be guided so as to be vertical relative to the stock supporting surface of the bed 10.

Inasmuch as the saw-supporting frame is pivotally supported at one end, viz: on the worm-shaft 28, to permit its being swung upward bodily to bring the saw band clear of the stock, means are provided for retaining the frame in its upwardly tilted condition to enable the operator to advance the stock for a new cut, or to insert new stock into the machine. These means are herein shown as a rod 80 (see Figs. 2 and 4) pivoted at its upper end on a lug 81 which projects from the rear of the casing 35, and passing through the eye of a clamping bolt 82 adapted to be pulled inwardly by a hand nut 83 to impinge said rod against a clamping face 84 on the bed plate 10, it being understood that the bolt is rotatably held to accommodate itself to the position of the rod 80. When the hand-nut 83 is loose the weight of the frame will naturally cause the same to gravitate and bring the saw into engagement with the stock, and inasmuch as the present machine is adapted to cut metals of different qualities, means are provided for feeding the saw into the stock under different pressures commensurate with the quality of the stock, the means consisting preferably of a weight 85 (see Figs. 2 and
3) adjustable on a rod 86 which is held on a bracket 87 by a set screw 88, such bracket forming a part of the frame or the casing 35 and so arranged that the rod 86 may project from either side thereon and thus bring the weight into properly adjusted position either to add to the weight, *per se*, of the frame, or to counterbalance the same to a more or less extent as occasion may require. The present machine also comprises what may be termed an "attachment", whereby the saw band may be guided relatively to the stock so as to avoid an excess of non-guided run of the saw between the driving and brake-rolls 66, 71, respectively, when the stock is of less lateral dimensions, and the movable jaw 14 is, therefore, nearer the stationary jaw 13 than is shown in the drawings. In other words: I desire to bring the guiding devices of the saw as near to the stock as possible, especially at the vertical point of the engagement between the saw and the stock to minimize any tendency of commencing the cut at a wrong point. This attachment is herein shown as a shiftable yoke 90, (see section in Fig. 7, and also dot and dash lines in Fig. 2), embracing the frame rods 37, 38, and terminating at its lower end in a pair of coacting rollers 91, 92, between which the saw band is properly guided, as will be readily understood, a clamp screw 93 serving to hold the yoke 90 in its adjusted position on the rods.

Means are provided for automatically arresting the operation of the saw as soon as the stock has been cut off, these means consisting preferably of mechanism comprising a lever which is actuated by the sudden drop of the saw frame (after the saw-band has performed its work) for a short distance below the top of the machine-bed, and which may be connected with the clutch or shipper-device on the countershaft from which the pulley 29 derives its motion through the belt 30.

The mechanism is clearly shown in Figs. 1, 5 and 6, and comprises a longitudinally-movable rod 95 slidable in the sleeve 73 above referred to and adapted to engage with its lower end the top face of an adjustable stop 96′ of an abutment 96 secured to the bed 10, so that when the frame drops, the rod 95 will remain stationary during the drop-movement of the frame which is provided with an ear 97 on which a lever 98 is fulcrumed, this lever being connected at one end with the rod 95, and at its other end with a cord 98 whereby the clutch or shipper of the countershaft (not shown) may be operated to stop the power-drive, which action is thus performed in an automatic manner.

Many changes may be made in the construction and organization of the several elements of my improved machine without departing from the spirit of the invention.

I claim:—

1. A sawing machine comprising an endless saw-band, means for guiding the working portion thereof in a predetermined plane, means for freely guiding the idle portion of said band so as to form a loose-loop return, and means for driving said band.

2. A sawing machine comprising an endless saw-band, means for guiding the working portion thereof in a predetermined plane, means for freely guiding the idle portion of said band so as to form a loose-loop return and comprising a series of separated tangent-contact supports each of which engages said band at a point only, and means for driving said band.

3. A sawing machine comprising an endless saw-band, means for guiding the active portion thereof in a predetermined plane, and means for freely guiding the idle portion of said band to form a loose-loop return running rearwardly of the active portion thereof relatively to the line of feed movement.

4. A sawing machine comprising an endless saw-band, means for guiding the active portion thereof in a predetermined plane, means for freely guiding the idle portion of said band so as to form a loose-loop return, means for driving the active portion of said band, and an auxiliary driving mechanism for advancing the idle portion of said band at a point remote from said first driving means.

5. The combination, with a stock support, a tiltable frame extending across the same, a saw-band carried by the frame, of a pair of rollers carried by the frame and in tangential engagement with said saw-band, means for driving said rollers in a continuously-advancing direction, said means comprising a worm gear and a worm coöperative therewith, and a shaft for operating said worm and extending through said frame and serving as a pivot axis therefor.

6. The combination, with a stock-support, a saw-supporting frame extending laterally thereof, a saw-band mounted for movement on said frame, and means for freely guiding said band on the frame to form a loose-loop return, of means for driving said saw-band in a continuously-advancing direction, and means for tensioning the portion of said saw-band which is in cutting operation across the stock on the support.

7. The combination, with a stock-support, a saw supporting frame extending laterally thereof, a saw-band mounted for movement on said frame, and means for freely guiding said band on the frame to form a loose-loop return, of means for driving said saw-band in a continuously-advancing direction, a pair of rollers carried by the frame and tangentially engaging said saw-band before the latter engages the stock on the support, and a brake mechanism applied to one of said rollers and for tensioning the active portion of the band.

8. The combination, with a stock-support, a saw supporting frame extending laterally thereof, a saw-band mounted for movement on said frame, and means for freely guiding said band on the frame to form a loose-loop return, of means for driving said saw-band in a continuously-advancing direction, a pair of rollers carried by the frame and engaging said saw-band before the latter engages the stock on the support, a brake drum operated by the movement of one of said rollers, and a band in engagement with said drum and for tensioning that portion of the saw which runs across the stock.

9. The combination, with a stock-support, a saw-supporting frame extending laterally thereof, an endless saw-band for movement on said frame, and means for driving said band in a continuously-advancing direction, said means comprising a pin roller and an idle roller coöperative therewith; of means for tensioning said saw in its run across the stock, said means comprising a pin roller in engagement with said saw and an idle roller coöperative therewith; and a brake band and drum connected with said pin roller.

10. The combination, with a stock-support, a saw-supporting frame extending laterally thereof and comprising a curved strap carried thereby, a saw-band mounted for movement on said frame, and means on said strap for guiding the idle portion of said band to form a loose-loop return, of a main driver for the active portion of the saw, and an auxiliary driver for the loose-loop return portion thereof.

11. The combination, with a stock-support, a saw-supporting frame extending across the same and consisting of a pair of parallel rods, and a saw-band mounted for movement on said frame, of means for driving said saw in a continuously-advancing direction, means for tensioning said saw in its run across the stock, means for guiding said saw to form a loose-loop return, and a yoke supported on said rods and adjustable thereon for guiding said saw in its active run relative to the driving mechanism.

12. The combination, with a stock-support, and a saw-supporting frame extending across the same and consisting of a pair of parallel rods, of means for driving said saw in a continuously-advancing direction, means for guiding said saw to form a loose-loop return, means for tensioning said saw in its run across the stock, a yoke supported on said rods and adjustable thereon relatively to the driving means, and a pair of rollers carried by said yoke for guiding said saw at a point between said tensioning means for the driving mechanism.

13. In a saw machine, a stationary work support, an endless band-saw having its working portion movable to cross the support in a straight line, means for guiding the working portion of the band in a plane perpendicular to such support, the idle portions of the saw being continued from such straight and perpendicularly disposed portion to form a loose-loop return, which is farther remote and offset from the plane of the support than the active portion of the saw so as to clear the work on the work support, supporting and guiding means for the saw movable for a working feed of the latter in a direction transversely of the support, and means for driving the band-saw continuously in the same direction.

Signed by me at Springfield, Mass., in presence of two subscribing witnesses.

CHARLES NAPIER.

Witnesses:
G. R. DRISCOLL,
C. V. WOOLSEY.